UNITED STATES PATENT OFFICE.

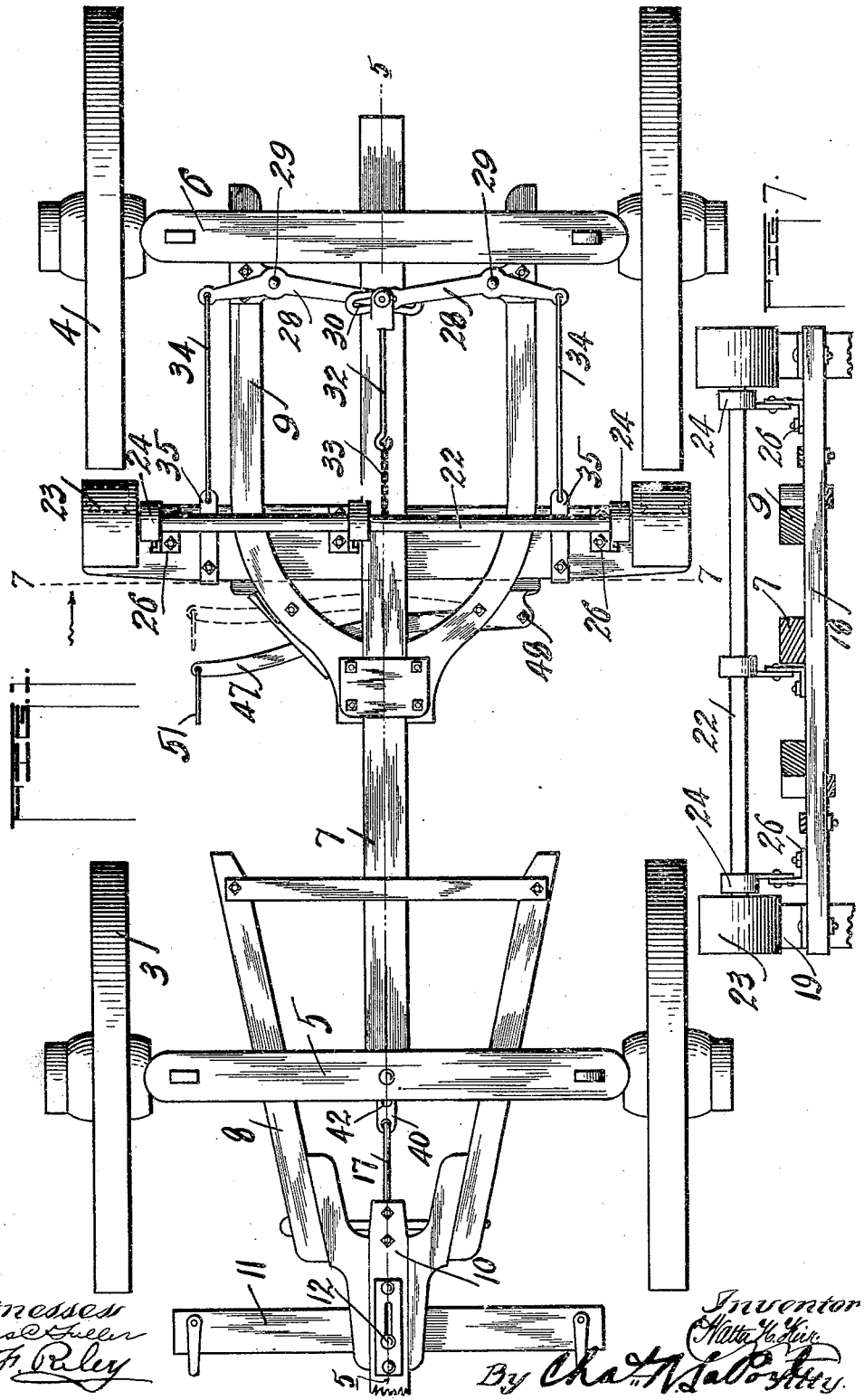

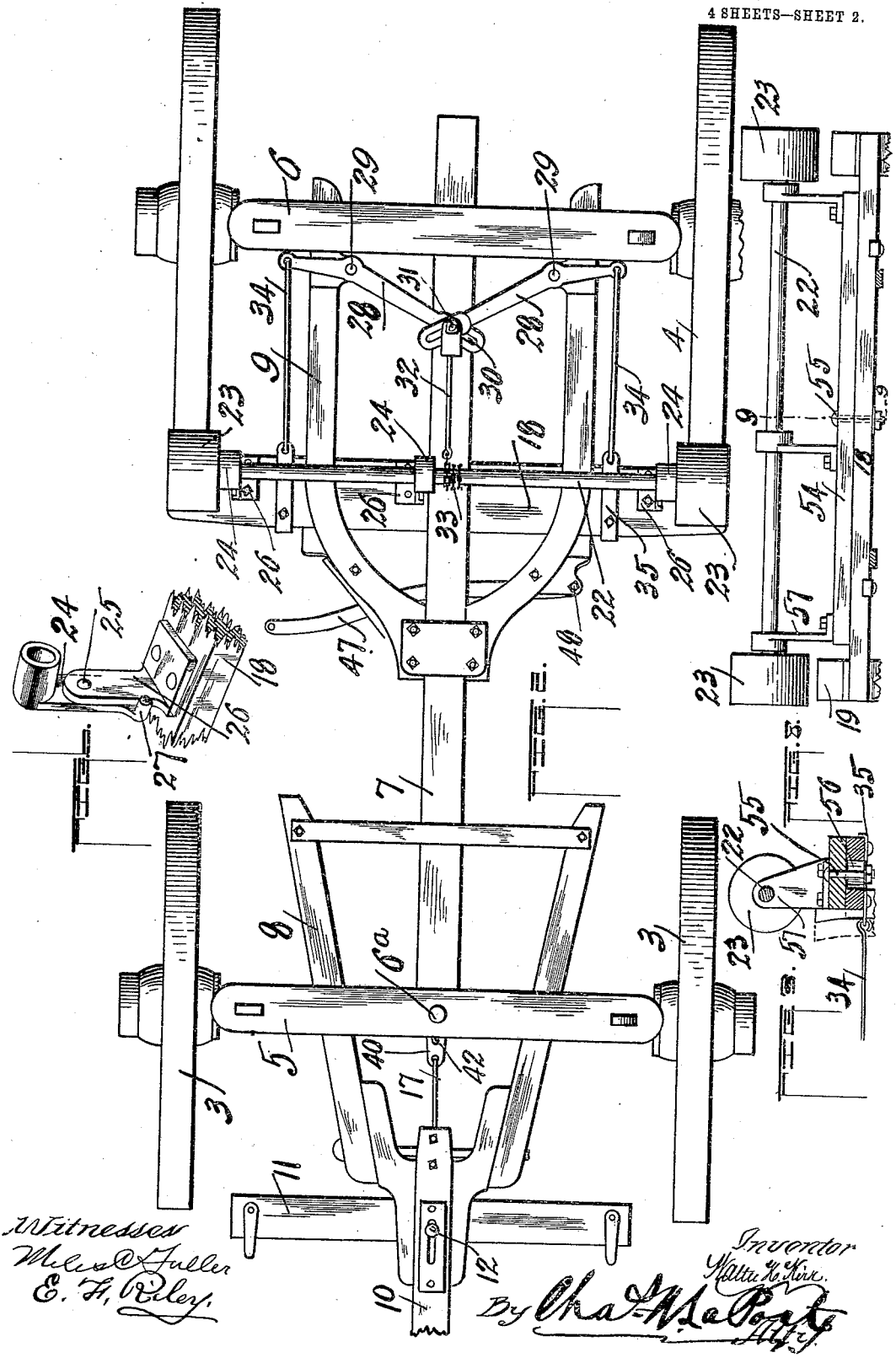

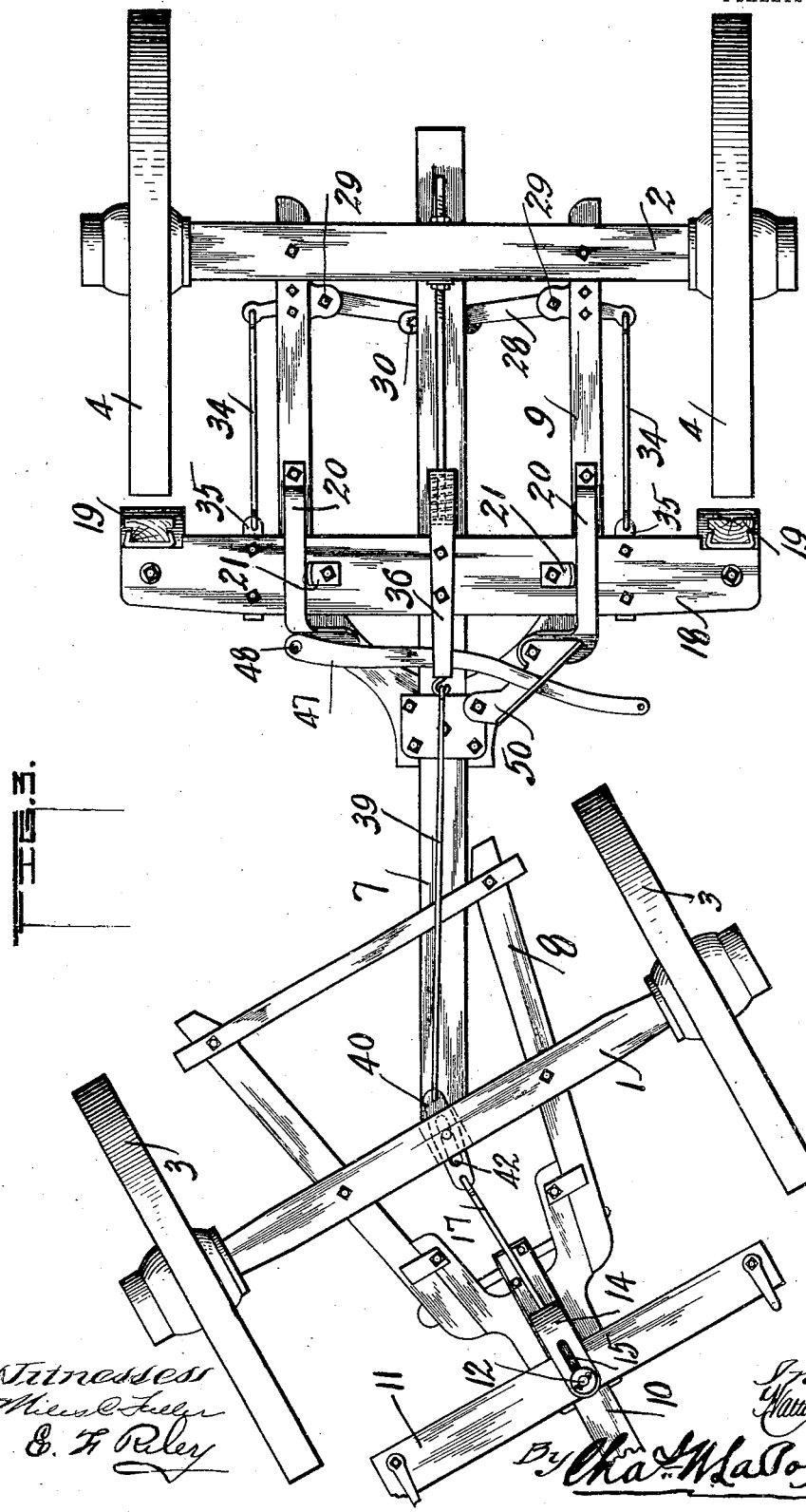

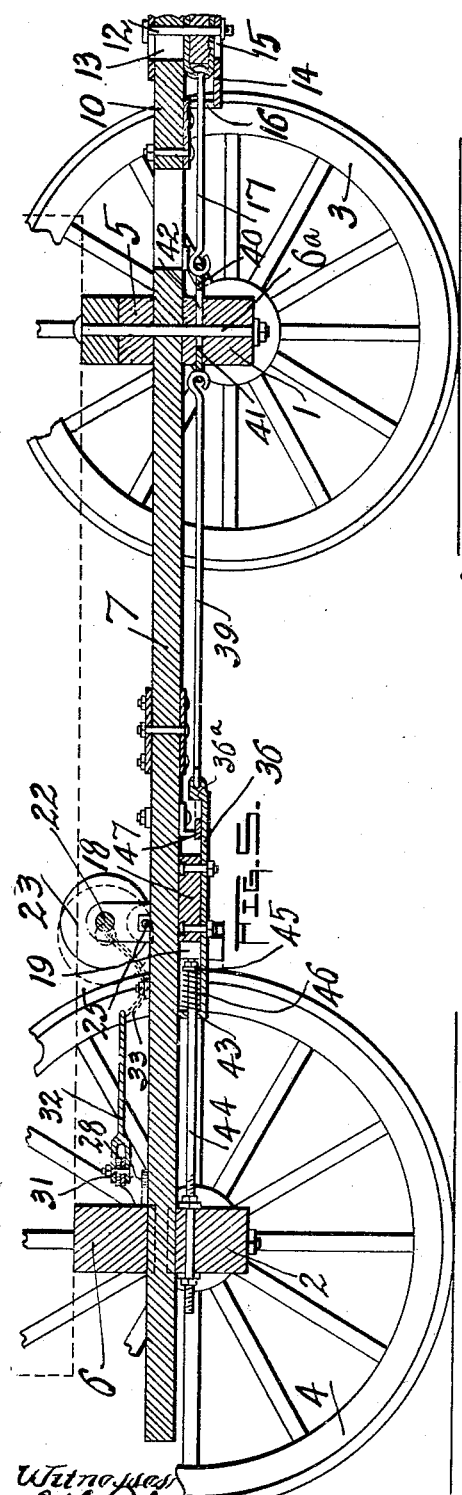
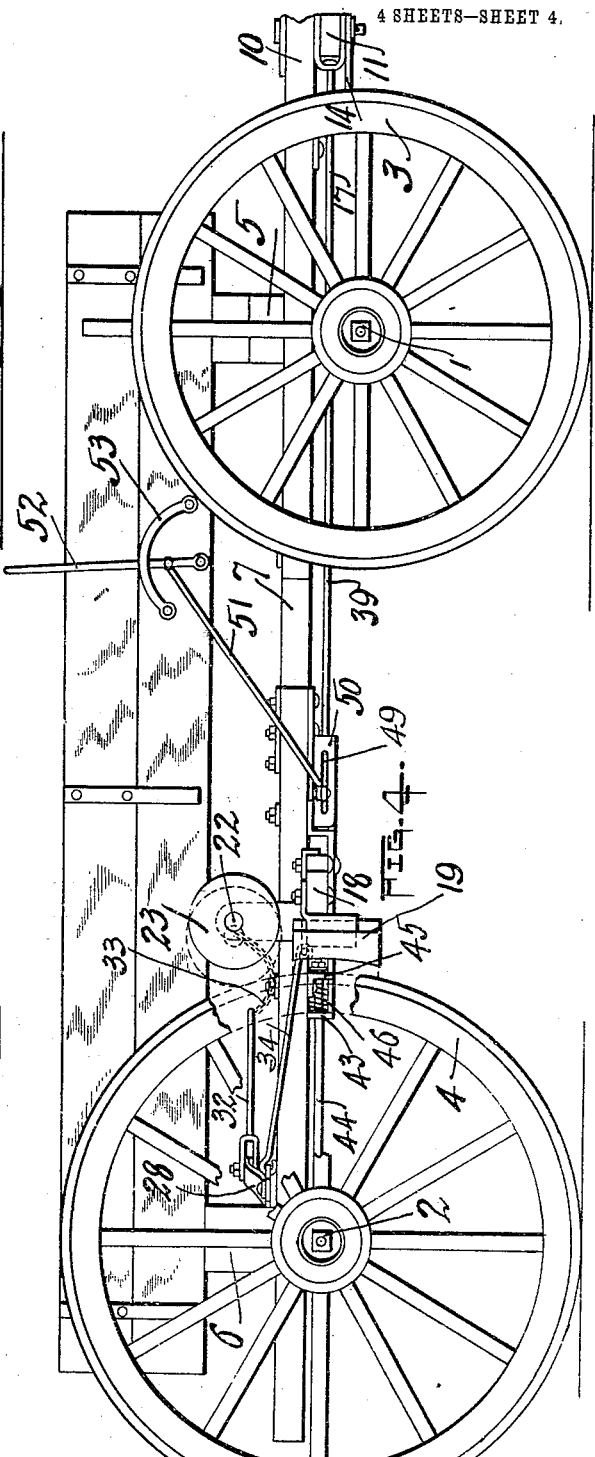

WALTER H. KIRK, OF PEORIA, ILLINOIS.

VEHICLE-BRAKE.

931,767.

Specification of Letters Patent. Patented Aug. 24, 1909.

Application filed March 13, 1909. Serial No. 483,095.

*To all whom it may concern:*

Be it known that I, WALTER H. KIRK, a citizen of the United States, residing at Peoria, in the county of Peoria and State of Illinois, have invented certain new and useful Improvements in Vehicle-Brakes; and I do hereby declare that the following is a full, clear, and exact description of the invention, which will enable others skilled in the art to which it appertains to make and use the same.

This invention has reference to certain new and useful improvements in automatic brakes for vehicles and relates particularly to that type of vehicle brake which is released from operative engagement with the vehicle wheels when the propelling force is applied to propel the vehicle, and which is set for engagement with the vehicle wheels when the propelling force is released.

One of the objects of the present invention is to operate the brake for causing the brake shoes to engage with the ground wheels, by means of pulleys or wheels supported by the brake beam and adapted to have frictional engagement with ground wheels, said pulleys or wheels carried by a shaft journaled in supports which are flexibly mounted on the brake beam, whereby, in the event of wear on the brake shoes, the effectiveness of the device will not be destroyed, as such connection between the brake beam and pulleys will permit the brake shoes being brought at all times into contact with the ground wheels.

A further object of the invention is the provision of toggle-levers between the shaft carrying the pulleys or wheels and the brake beam, by means of which the brake beam is set when the propelling force ceases to act, and also to lever mechanism adapted to be manually operated for placing the brake beam and pulleys or wheels thereon in operative position, so that said brake will not be actuated when the propelling force ceases to act.

For a full understanding of the invention and the merits thereof and also to acquire a knowledge of the details of construction of the means for effecting the result, reference is to be had to the following description and accompanying drawing in which;

Figure 1 is a top plan view of the running gear of a vehicle, showing my improved brake mechanism applied thereto; the body of the vehicle is removed and with it the lever mechanism for manually setting the brake; Fig. 2 is a view similar to Fig. 1, except that the brake shoes and pulleys thereon are in engagement with the ground wheels; Fig. 3 is a bottom plan view of the parts shown in Figs. 1 and 2, with the brake shoes shown in position similar to Fig. 1 and with the front truck of said gear thrown around into a position, as in the act of turning, for the purpose of showing the position of the brake rods when the front truck is turned. Fig. 4 is a side elevation of the parts shown in Fig. 1 and also showing the box of the vehicle supported on the trucks and the position of the lever mechanism for manually setting the brakes; Fig. 5 is a vertical longitudinal section on the line 5—5 of Fig. 1; Fig. 6 is a detail perspective view showing one of the pivoted supports for the shaft carrying the pulleys or wheels; Fig. 7 is a vertical cross section on the line 7—7 of Fig. 1, looking in the direction of the arrow shown on said figure; Fig. 8 is a detail in elevation showing a modified structure for supporting the shaft carrying the pulleys or wheels, and Fig. 9 is a cross section on the line 9—9 of Fig. 8.

Like numerals of reference indicate corresponding parts throughout the figures.

1 and 2 designate the front and rear axles on which are carried the ground wheels 3 and 4 and supported by said axles are the front and rear bolsters 5 and 6, the bolster 5 connected to the front axle 1 by means of the king-bolt 6ª, and 7 denotes the usual reach bar which connects the front and rear axles 1 and 2, and the king-bolt 6 previously referred to passes up through the reach bar, as shown in Fig. 5.

8 refers generally to the front hound, and 9 refers generally to the rear hound, both of said hounds being connected respectively, with the front and rear axles, and with the reach bar 7. To the front hound is connected the tongue or pole 10 and to said tongue or pole is connected a double tree 11, which may be of the usual construction, but the connection of the double tree with said tongue or pole 10 is such that it may have movement longitudinally of said tongue. The double tree 11 is shown connected to the tongue or pole 10 by means of the bolt or coupling pin 12 which passes up through a slot 13 in the pole or tongue 10, which said slot is preferably longest longitudinally of said tongue or pole 10.

A strap 14, see Figs. 3 and 5 is provided, which is attached to the lower side of the tongue or pole 10 and serves as a bearing for the double tree 11 on the pole and said strap 14 is provided with a longitudinal slot 15 through which the bolt 12 passes, and also with a slot 16 through which is operatively carried a connecting rod 17, which has its forward end suitably attached or secured to the double tree 11. The functions of this connecting rod 17 will be further explained.

18 denotes a brake beam, preferably carried on the under side of the reach bar 7 and as shown extends transversely of the running gear, and to its opposite ends are suitably attached or secured brake shoes 19 which are adapted to have engagement with the peripheral face of the ground wheels 4. This brake beam is supported to have movement longitudinally of the reach bar 7 and the rear hounds 9, and is preferably guided in its movement on said reach bar and hounds by means of the straps 20 secured to the hounds, in the manner best seen in Fig. 3, wherein said straps are secured to the underside of the hounds and extend cross wise of the brake beam 18, and 21 are plates which are attached to the underside of said brake beam and have a sliding engagement with the inner edges of the straps 20, serving not only as a guide for the longitudinal movement of the brake beam, but also coöperate with said straps for preventing endwise movement of the said brake beam.

22 has reference to a transversely disposed shaft on the opposite ends of which are carried pulleys or wheels 23 which are adapted, under certain conditions, to have a frictional engagement with the peripheral faces of the ground wheels 4. The shaft 22 is preferably journaled in supports 24 and said supports are in turn pivotally connected at 25 with bracket arms 26 secured to the brake beam 18. The supports 24 are each provided with a finger 27 which is adapted to have engagement with the rear edges of the bracket arms 26, for purposes which will be explained.

28 are similar toggle-levers which have a pivotal connection at 29 with the opposite portions of the rear hound 9 and at a point in close proximity to the rear axle 2. The inner ends of the toggle-levers cross each other and are provided with longitudinal slots 30 through which a bolt 31 is passed and is adapted to have movement, and said bolt connects the toggle-levers with the bifurcated end of a bar 32 to the forward end of which is attached a chain or other flexible connection 33 which is connected with the shaft 22 and adapted to be wound on said shaft. To the outer ends of said toggle-levers 28 are connected rods 34 and said rods at their forward ends are connected with straps 35 which are secured to the brake beam 18 as shown.

To the center of the brake beam 18 and extending crosswise thereof on the under side is attached a plate 36. To the forward end of said plate 36 is connected a rod 39 and said rod 39 is in turn connected with a plate 40 which is carried transversely of the axle 1 through an opening 41 therethrough and to the forward end of said plate 40 is connected the rod 17, previously described as having connection with the double tree 11. The plate 40, as shown in Fig. 3, is provided with a longitudinal slot 42 through which the king-bolt 6ª is operatively carried and said slot is provided in the plate 40 to adapt it to have movement transversely of the axle 1. The plate 36 extends some distance rearwardly of the brake beam 18, and as shown in Fig. 5 is bent upwardly as as 43 forming a shoulder through which is operatively carried a rod 44, which said rod at its rear end passes through and is secured to the rear axle 2. The forward end of the rod 44 passes through a plate 45 secured to and extending downwardly from the reach bar 7, see Fig. 4, between which said plate 45 and the shoulder 43 is carried a coil spring 46 which encircles the rod 44 as shown.

In operation, any pull upon the double tree 11 will draw the rod 17, the plate 40, the rod 39, the plate 36 and brake beam 18, forwardly, compressing the spring 46 and at the same time removing the pulleys or wheels 23 on the brake beam from engagement with the ground wheels 4. Immediately upon the release of the double tree, the spring 46 expands, moving the plate 36 rearwardly and with it the brake beam 18 and parts connected with said brake beam and said plate 36, especially the pulleys or wheels 23, which will cause said pulleys or wheels to have a frictional contact with the ground wheels 4, operating the pulleys or wheels 23 which will rotate the shaft 22 and wind the chain 33 about said shaft, in the manner seen in Fig. 2, drawing the inner ends of the toggle-levers 28 toward said shaft which will operate to move the brake beam rearwardly causing the brake shoes 19 to firmly impinge against the peripheral face of the wheels 4. Immediately upon the double tree 11 being moved forwardly, the brake shoes and pulleys are withdrawn from engagement with the ground wheels 4, and such operation will reverse the operation of the toggle-levers, as just described, which will cause the chain 33 to be unwound from the shaft 22 and the parts otherwise placed in a condition for a further operation of setting the brake shoes, as described.

In addition to the means for automatically setting the brake, whenever the double tree 11 is released, I have provided a mechanism which may be manually operated for moving the brake shoes and pulleys or wheels into an inoperative position and locked in such position. This mechanism comprises a lever 47 pivotally connected at 48 to one of the straps 20 attached to the rear hound 9, and said lever extends transversely of the running gear above the plate 36 and below the reach 7, and passes through a slot 49 in a bracket 50 secured to said hound. To the free end of this lever is connected a rod 51 and said rod is in turn connected to an operator's lever 52 preferably pivotally connected with the box or body of the vehicle, and said lever 52 is adapted to have a locking engagement with a rack 53, which is of a construction ordinarily used, being provided with ratchet teeth with which the lever engages. The ratchet teeth are omitted from the drawings, particularly Fig. 4, on account of said teeth being on the rear side of the rack, and it is thought that it will not be necessary to show the same.

For operating the brake beam 18 by means of the lever 47 for setting the said beam so that the pulleys 23 will be set and retained in an inoperative position, I provide the plate 36, see Fig. 5, with an offset 36ª which will be engaged by the lever 47 when it is operated in the manner previously explained, and such engagement will move the plate 36 forwardly on the running gear and with it the brake beam, as will be understood.

My object in mounting the shaft 22 in supports 24 which are pivotally connected with the bracket arms 26 on the brake beam 18, is to accommodate the structure to the wear on the brake shoes 19. Constant use of the mechanism will wear away the brake shoes, and unless provision is made to accommodate the structure to this wear the brake shoes can not be brought to a position to do active service on the wheels. In my device, no matter how much the brake shoes wear, when the pulleys 23 engage the ground wheels and the brake beam is actuated, there will be sufficient movement or play between the brackets 26 and supports 24 to permit the brake shoes to be brought into engagement with the ground wheels. To prevent the rollers from moving inadvertently into engagement with the ground wheels, I provide the supports 24 with fingers 27 which will come into contact with the brackets 26 and limit the oscillation of the shaft and rollers in the direction of the ground wheels.

It will be observed from an examination of Fig. 5 that the slot 13 in the tongue or pole 10 limits the movement of the bolt or coupling pin 12 and thereby the double tree 11, and is so arranged that the pull is on the tongue of the vehicle and not upon any of the automatic brake parts to which the double tree is connected.

In Figs. 8 and 9 is shown a modified support for the shaft 22 on the brake beam 18, which consists of a bar 54 supported upon and extending longitudinally of the beam 18; the beam and bar connected by the bolt 55 which passes through the beam and bar and is adapted to have movement crosswise of the beam in a slot 56 therein. The shaft 22 in this instance is journaled in supports 57 secured in a fixed manner to the bar 54. With this construction it will be seen that the bar 54 and rollers 23 may have a sliding movement crosswise of the beam to allow for any wearing of the brake shoes 19.

Having thus fully described my invention, what I claim and desire to secure by Letters Patent of the United States, is:—

1. In a wagon brake, the combination with the running gear of a wagon, a reciprocally supported brake beam and brake shoes attached thereto, a shaft, a movable support for the shaft on said beam, friction pulleys on the opposite ends of said shaft adapted to be operated by engagement with the ground wheels of the wagon, and connections between said shaft and said brake for operating the brake beam when the pulleys engage the ground wheels.

2. In a wagon brake, the combination with the running gear of a wagon, a reciprocally supported brake beam and brake shoes attached thereto, a shaft revolubly supported on said beam, friction pulleys mounted to rotate with said shaft, a pair of toggle levers pivotally connected with the rear hound of the wagon and having overlapping slotted ends, connections between said levers and said brake beams, and means having a common connection with the overlapping ends of said toggle levers and also connected with said shaft.

3. In a wagon brake, the combination with the running gear of a wagon, a reciprocally supported brake beam and brake shoes attached thereto, a shaft, supports for said shaft, said supports pivotally mounted on said brake beam, pulleys connected with said shaft and arranged to have a frictional engagement with the ground wheels, and operative connections between said shaft and said beam, whereby when said pulleys are brought into frictional engagement with the ground wheels of the wagon, the brake beam will be moved to a position to cause the brake shoes to engage the ground wheels.

4. In a wagon brake, the combination with the running gear of a wagon, a reciprocally supported brake beam and brake shoes attached thereto, a shaft, means having a flexible connection with the brake beam and serving as a support for said shaft, friction pulleys connected with the opposite ends of said shaft and adapted to have a frictional contact with the ground wheels of the wagon, manually operated means for setting the brake beam, the shaft and pulleys in an inoperative position, means for automatically moving the brake beam and pulleys to a position so that said pulleys will engage the ground wheels when the manually operative means is released, and means operated by the said shaft for causing the brake shoes of the beam to impinge against the peripheral face of the ground wheel.

5. In a wagon brake, the combination with the running gear of a wagon, a reciprocally supported brake beam and brake shoes attached thereto, a shaft, a movable support for the shaft on said beam, friction pulleys mounted to rotate with said shaft, a pair of toggle levers pivotally connected with the rear hound of the wagon and having overlapping slotted ends, connections between said levers and said brake beams, and means having a common connection with the overlapping ends of said toggle levers and also connected with said shaft.

6. In a wagon brake, the combination with the running gear of a wagon, a reciprocally supported brake beam and brake shoes attached thereto, brackets mounted on said beam, supports having a pivotal connection with said brackets, a shaft journaled in said supports, pulleys connected with said shaft and arranged to have a frictional engagement with the ground wheels, and operative connections between said shaft and said beam, whereby when said pulleys are brought into frictional engagement with the ground wheels of the wagon, the brake beam will be moved to a position to cause the brake shoes to engage the ground wheels.

7. In a wagon brake, the combination with the running gear of a wagon, a reciprocally supported brake beam and brake shoes attached thereto, brackets mounted on said beam, supports having a pivotal connection with said brackets, a shaft journaled in said supports, pulleys connected with said shaft and arranged to have a frictional engagement with the ground wheels, means for limiting the oscillation of the supports on the brackets in one direction, and operative connections between said shaft and said beam, whereby when said pulleys are brought into frictional engagement with the ground wheels of the wagon, the brake beam will be moved to a position to cause the brake shoes to engage the ground wheels.

8. In a wagon brake, the combination with the running gear of a wagon, a reciprocally supported brake beam and brake shoes attached thereto, straps secured to the rear hounds of the wagon, and extending crosswise of the brake beam, members secured to the brake beam and engaging said straps, said members and straps serving as a guide for the beam and preventing endwise movement thereof, a shaft mounted on said beam, pulleys on said shaft adapted to have a frictional engagement with the ground wheels, and means operated by said shaft when said pulleys are in engagement with the ground wheels for drawing the beam and brake shoes into a position for causing the brake shoes to impinge against the ground wheels.

In testimony whereof I affix my signature, in presence of two witnesses.

WALTER H. KIRK.

Witnesses:
ELI HAVENS,
CHAS. N. LA PORTE.